(12) United States Patent
Kamada

(10) Patent No.: US 9,796,836 B2
(45) Date of Patent: Oct. 24, 2017

(54) RUBBER COMPOSITION AND PNEUMATIC TIRE

(71) Applicant: TOYO TIRE & RUBBER CO., LTD., Osaka-shi, Osaka (JP)

(72) Inventor: Shinsaku Kamada, Osaka-shi (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 35 days.

(21) Appl. No.: 14/875,816

(22) Filed: Oct. 6, 2015

(65) Prior Publication Data

US 2016/0102194 A1    Apr. 14, 2016

(30) Foreign Application Priority Data

Oct. 8, 2014    (JP) ................. 2014-207287

(51) Int. Cl.
*C08L 9/06* (2006.01)
*B60C 1/00* (2006.01)

(52) U.S. Cl.
CPC ............. *C08L 9/06* (2013.01); *B60C 1/0016* (2013.01); *B60C 1/0025* (2013.01); *B60C 2001/005* (2013.01)

(58) Field of Classification Search
CPC ....... C08L 9/06; B60C 1/0016; B60C 1/0025; B60C 2001/005
USPC ........................................................ 524/476
See application file for complete search history.

(56) References Cited

U.S. PATENT DOCUMENTS 3,826,735 A * 7/1974 Shinomura ............. C08L 21/00
                                                                106/270

FOREIGN PATENT DOCUMENTS

| CN | 103814074 A | | 5/2014 |
|---|---|---|---|
| JP | 2000-86824 A | | 3/2000 |
| JP | 2000086824 A | * | 3/2000 |
| JP | 2010-53249 A | | 3/2010 |
| JP | 2013-82884 A | | 5/2013 |

OTHER PUBLICATIONS

JP2000-086824A—machine translation.*
Office Action issued in corresponding Chinese Application No. 201510633195.8, dated Jan. 23, 2017, 3 pages.

* cited by examiner

*Primary Examiner* — Ling Choi
*Assistant Examiner* — Ronald Grinsted
(74) *Attorney, Agent, or Firm* — Westerman, Hattori, Daniels & Adrian, LLP

(57) ABSTRACT

A rubber composition comprising a diene rubber, a tackifier comprising a resin having a weight average molecular weight of from 1,500 to 2,500, and a wax is disclosed. The wax contains from 20.0 to 40.0 mass % of a linear saturated hydrocarbon having from 25 to 30 carbon atoms, from 8.0 to 18.0 mass % of a linear saturated hydrocarbon having from 35 to 40 carbon atoms, and from 1.0 to 6.0 mass % of a linear saturated hydrocarbon having 45 or more carbon atoms. The amount of the tackifier added is larger than the amount of the wax added.

7 Claims, No Drawings

RUBBER COMPOSITION AND PNEUMATIC TIRE

CROSS-REFERENCE TO RELATED APPLICATIONS

This application is based upon and claims the benefit of priority from the prior Japanese Patent Application No. 2014-207287, filed on Oct. 8, 2014; the entire contents of which are incorporated herein by reference.

BACKGROUND

1. Technical Field

The present invention relates to a rubber composition and a pneumatic tire using the rubber composition.

2. Related Art

Conventionally, a wax is added to a rubber composition constituting, for example, a side wall part of a pneumatic tire in order to improve ozone resistance. The wax blooms on the surface of a rubber after vulcanization to form a coating film of a wax on the surface of a rubber, thereby cutting off ozone and protecting the rubber. On the other hand, a resin as a tackifier is sometimes added to a rubber composition in order to improve adhesion to rolls in a kneading step. Rubber compositions having a wax and a tackifier added thereto are known, and various rubber compositions are proposed (for example, see JP-A-2010-053249, JP-A-2013-082884 and JP-A-2000-086824).

The present inventors found the following new problem in a rubber composition having both a wax and a tackifier added thereto. That is, it was ascertained that where a large amount of a tackifier is added in order to improve adhesion to rolls, the tackifier moves to the surface of a rubber prior to a wax and cures thereon, and the cured resin film cracks, and additionally, the crack propagates on the surface of a rubber, thereby cracks occur on the surface of a rubber. It was further ascertained that the tackifier moved to the rubber surface disturbs blooming of a wax, thereby accelerating occurrence of cracks by ultraviolet rays.

The present embodiment is made for solving the new problem and has an object to provide a rubber composition that enables a wax to bloom prior to that a tackifier moves to the rubber surface and can suppress the occurrence of cracks by ultraviolet rays while improving adhesion to rolls, even in the case where a large amount of the tackifier has been added.

SUMMARY

A rubber composition according to the present embodiment comprises a diene rubber, a tackifier comprising a resin having a weight average molecular weight of from 1,500 to 2,500, and a wax, wherein the wax contains from 20.0 to 40.0 mass % of a linear saturated hydrocarbon having from 25 to 30 carbon atoms, from 8.0 to 18.0 mass % of a linear saturated hydrocarbon having from 35 to 40 carbon atoms, and from 1.0 to 6.0 mass % of a linear saturated hydrocarbon having 45 or more carbon atoms, and the amount of the tackifier is larger than the amount of the wax.

A pneumatic tire according to one embodiment uses the rubber composition in at least a part thereof.

DETAILED DESCRIPTION

The rubber composition according to the present embodiment comprises a diene rubber, a tackifier and a wax.

The diene rubber as a rubber component is not particularly limited. Examples of the diene rubber that can be used include natural rubber (NR), isoprene rubber (IR), butadiene rubber (BR), styrene-butadiene rubber (SBR), styrene-isoprene rubber, butadiene-isoprene rubber, styrene-butadiene-isoprene rubber, nitrile rubber (NBR), chloroprene rubber (CR) and butyl rubber (IIR). Those rubbers can be used alone or as mixtures of two or more kinds thereof. The diene rubber is more preferably NR, SBR, BR or a blend of two or more kinds thereof.

In the present embodiment, a resin having a weight average molecular weight (Mw) of from 1,500 to 2,500 is used as the tackifier. Where the molecular weight of the resin as the tackifier is too small, the resin moves to the rubber surface prior to the wax, and cracks may occur in a resin film cured on the rubber surface. On the other hand, where the molecular weight of the resin is too large, hardness of the rubber composition after vulcanization may become too high. For this reason, the weight average molecular weight of the resin is preferably from 1,500 to 2,200, and more preferably from 1,800 to 2,200.

Examples of the resin used as the tackifier include a petroleum resin, a phenol resin, a coumarone-based resin, a terpene-based resin and an aromatic vinyl polymer (a resin obtained by polymerizing α-methylstyrene and/or styrene). Those resins may be used alone or in combination of two or more kinds thereof.

Examples of the petroleum resin include an aliphatic petroleum resin, an aromatic petroleum resin and an aliphatic/aromatic copolymerized petroleum resin. The aliphatic petroleum resin (sometimes called C5 petroleum resin) is a resin obtained by cationic polymerization of an unsaturated monomer such as isoprene or cyclopentadiene that is a petroleum fraction (C5 fraction) corresponding to a carbon number of from 4 to 5, and may be a hydrogenated resin. The aromatic petroleum resin (sometimes called C9 petroleum resin) is a resin obtained by cationic polymerization of a monomer such as vinyltoluene, alkylstyrene or indene that is a petroleum fraction (C9 fraction) corresponding to a carbon number of from 8 to 10, and may be a hydrogenated resin. The aliphatic/aromatic copolymerized petroleum resin (sometimes called C5/C9 petroleum resin) is a resin obtained by copolymerization of the C5 fraction and the C9 fraction, and may be a hydrogenated resin.

Examples of the phenol resin include a phenol-formaldehyde resin, an alkylphenol-formaldehyde resin, and alkylphenol-acetylene resin and an oil-modified phenol-formaldehyde resin. Examples of the coumarone-based resin include a coumarone resin and a coumarone-indene resin. Examples of the terpene-based resin include a polyterpene and a terpene-phenol resin. Examples of the aromatic vinyl polymer include a homopolymer of α-methylstyrene (that is, poly(α-methylstyrene)), a homopolymer of styrene (that is, a polystyrene) and a copolymer of α-methylstyrene and styrene (that is, a styrene-α-methylstyrene copolymer).

In the present embodiment, a wax having the following carbon number distribution is used as the wax. That is, when the content of the linear saturated hydrocarbon having from 25 to 30 carbon atoms is X (mass %), the content of the linear saturated hydrocarbon having from 35 to 40 carbon atoms is Y (mass %) and the content of the linear saturated hydrocarbon having 45 or more carbon atoms is Z (mass %), in 100 mass % of a wax, the wax satisfying $20.0 \leq X \leq 40.0$, $8.0 \leq Y \leq 18.0$ and $1.0 \leq Z \leq 6.0$ is used.

Where X is less than 20.0 mass %, the tackifier is easy to move to the rubber surface prior to the wax in a low temperature region. Where Y is less than 8.0 mass %, the tackifier is easy to move to the rubber surface prior to the wax at ordinary temperature. Where Z is less than 1.0 mass %, the tackifier is easy to move to the rubber surface prior to the wax in a high temperature region. Where the tackifier moves to the rubber surface prior to the wax, a cured resin film causes cracks, and it is difficult to suppress the occurrence of cracks by ultraviolet rays. Where X exceeds 40.0 mass %, the wax blooms excessively in a low temperature region, and as a result, the appearance may be deteriorated. Where Y exceeds 18.0 mass %, the wax blooms excessively at ordinary temperature, and as a result, the appearance may be deteriorated. Where Z exceeds 6.0 mass %, the wax blooms excessively in a high temperature region, and as a result, the appearance may be deteriorated.

The carbon number distribution of the wax more preferably satisfies $24.0 \leq X \leq 35.0$, $9.0 \leq Y \leq 17.0$ and $2.0 \leq Z \leq 6.0$. The upper limit of carbon number in the linear saturated hydrocarbon having 45 or more carbon atoms defined by the content Z is not particularly limited, but the carbon number is generally 80 or less. The content of the linear saturated hydrocarbons in 100 mass % of the wax is not particularly limited, but is preferably 70 mass % or more, and more preferably 80 mass % or more.

A preparation method of a petroleum wax (paraffin wax) having the carbon atom distribution as above is not particularly limited. For example, concentrated fractions of the respective components are obtained by the combination of the conventional methods such as a vacuum distillation method, a solvent deoiling method, a sweating method and a press deoiling method, and the fractions are mixed so as to be the mixing ratio as above, thereby the petroleum wax can be prepared.

The carbon number distribution of the wax can be measured by the conventional method using gas chromatography. In detail, the method includes a method for measuring from 180 to 390° C. under the conditions of carrier gas: helium, flow rate: 4 mL/min and temperature-rising rate: 15° C./min using a polyimide-coated capillary column, using capillary GC as a measurement apparatus.

In the rubber composition according to the present embodiment, the amount of the tackifier added is larger than the amount of the wax added. In the case where the amount of the tackifier added is large, the tackifier becomes easy to move to the rubber surface prior to the wax, resulting in the above-described problems.

The amount of the tackifier added is preferably from more than 5 to 20 parts by mass, and more preferably 7 to 15 parts by mass, per 100 parts by mass of the diene rubber. When the amount of the tackifier added is more than 5 parts by mass, the effect of improving adhesion to rolls can be enhanced. When the amount of the tackifier added is 20 parts by mass or less, deterioration of process properties due to excessive adhesion to rolls can be prevented.

The amount of the wax added is preferably from 1.5 to 5 parts by mass, and more preferably from 1.5 to 4.0 parts by mass, per 100 parts by mass of the diene rubber. When the amount of the wax added is 1.5 parts by mass or more, ozone resistance can be maintained. When the amount of the wax added is 5 parts by mass or less, excessive blooming to a rubber surface is suppressed, and deterioration of the appearance can be prevented.

Carbon black and/or silica can be added as a filler to the rubber composition according to the present embodiment. The carbon black is not particularly limited, and furnace carbon blacks of various grades such as SAF grade (N100 Series), ISAF grade (N200 Series), HAF grade (N300 Series) and FEF grade (N500 Series) (all is ASTM grade) that are used as a rubber reinforcing agent can be used. Silica is not particularly limited, and wet silica (hydrous silicic acid) is preferably used. The amount of the filler added is not particularly limited, but is preferably from 10 to 150 parts by mass, more preferably from 20 to 120 parts by mass, and still more preferably from 30 to 100 parts by mass, per 100 parts by mass of the diene rubber. As one embodiment, the amount of the carbon black added may be from 10 to 120 parts by mass, and may be from 20 to 100 parts by mass, per 100 parts by mass of the diene rubber. The amount of the silica added may be from 10 to 120 parts by mass, and may be from 20 to 100 parts by mass, per 100 parts by mass of the diene rubber.

When the silica is added as the filler, a silane coupling agent such as sulfide silane or mercaptosilane may be added in order to further improve dispersibility of the silica. The amount of the silane coupling agent added is not particularly limited, but is preferably from 2 to 20 mass % based on the amount of the silica added.

Various additives generally used in a rubber composition, such as an oil, zinc flower, stearic acid, an age resister, a vulcanizing agent or a vulcanization accelerator, can be added to the rubber composition according to the present embodiment, in addition to the above each component. Examples of the vulcanizing agent include sulfur components such as powdered sulfur, precipitated sulfur, colloidal sulfur, insoluble sulfur and highly dispersive sulfur. Although not particularly limited, the amount of the vulcanizing agent added is preferably from 0.1 to 10 parts by mass, and more preferably from 0.5 to 5 parts by mass, per 100 parts by mass of the diene rubber.

The rubber composition according to the embodiment can be prepared by kneading the necessary components according to the conventional method using a mixing machine generally used such as Banbury mixer, kneader or rolls. That is, a rubber composition can be prepared by adding other compounding ingredients excluding a vulcanizing agent and a vulcanization accelerator to a diene rubber together with a tackifier and a wax, followed by mixing, in a first mixing stage, and then adding a vulcanizing agent and a vulcanization accelerator to the mixture obtained, followed by mixing, in a final mixing stage.

The rubber composition thus obtained can be used in various rubber members such as a rubber member for a tire, a rubber member for an antivibration rubber, a rubber member for a conveyer belt and the like. The rubber composition is preferably used in a tire, and can be applied to respective parts of a tire, such as tread rubber, side wall rubber or rim strip rubber of a pneumatic tire having various sizes and to be used in a variety of applications, for example, for passenger cars or for heavy load of trucks and buses. The rubber composition is formed into a given shape by, for example, extrusion processing according to the conventional method, the shaped product is combined with other parts to produce a green tire (unvulcanized tire), and the green tire is then vulcanization molded at, for example, from 140 to 180° C. Thus, a pneumatic tire can be manufactured. Above all, it is preferred to use the rubber composition in a rubber for tire outer layer, and it is particularly preferred to use the rubber composition as a formulation of a tread, a formulation of a side wall and a formulation for a rim strip.

According to the present embodiment, when the tackifier comprising a resin having the above-described specific molecular weight and the wax having the above-described specific carbon number distribution are concurrently used, the wax can be bloomed on the rubber surface prior to that the tackifier moves to the rubber surface, even in the case where the tackifier has been added in an amount larger than the amount of the wax. As a result, the occurrence of cracks by ultraviolet rays can be suppressed while improving adhesion to rolls.

EXAMPLES

Examples of the present invention are described below, but the present invention is not construed as being limited to those examples.

Banbury mixer was used. According to the formulation (parts by mass) shown in Table 1 below, compounding ingredients excluding sulfur and a vulcanization accelerator were added to a diene rubber, followed by kneading (discharge temperature: 160° C.), in a first mixing stage, and sulfur and a vulcanization accelerator were then added to the kneaded material obtained, followed by kneading (discharge temperature: 90° C.), in a final mixing stage. Thus, a rubber composition was prepared. The detail of each component in Table 1 is as follows.

SBR1: Styrene-butadiene rubber, "VSL5025" manufactured by LANXESS

SBR 2: Styrene-butadiene rubber, "SBR1502" manufactured by JSR Corporation

Carbon black: N339, "SEAST KH" manufactured by Tokai Carbon Co., Ltd.

Silica: "NIPSIL AQ" manufactured by Tosoh Silica Corporation

Silane coupling agent: "Si75" manufactured by EVONIK DEGUSSA

Paraffin oil: "PROCESS NC140" manufactured by JX Nippon Oil & Energy Corporation Stearic acid: "LUNAC S-20" manufactured by Kao Corporation Zinc flower: "Zinc Flower Grade 1" manufactured by Mitsui Mining & Smelting Co., Ltd.

Age resister: "ANTIGEN 6C" manufactured by Sumitomo Chemical Co., Ltd.

Vulcanization accelerator: "SOXINOL CZ" manufactured by Sumitomo Chemical Co., Ltd.

Sulfur: "Powdered Sulfur" manufactured by Tsurumi Chemical Industry Co., Ltd.

Resin A: Aliphatic/aromatic copolymerized petroleum resin, "PETROTACK 90" manufactured by Tosoh Corporation, Mn=900, Mw=2000

Resin B: Phenol-formalin thermoplastic resin, "DUREZ 19900", manufactured by Sumitomo Bakelite Co., Ltd., Mn=1000, Mw=1500

Resin C: α-Methylstyrene polymer, "Sylvares SA120", manufactured by ARIZONA CHEMICAL CO., Mn=1100, Mw=2200

Resin D: α-Methylstyrene polymer, "Sylvares SA100", manufactured by ARIZONA CHEMICAL CO., Mn=800, Mw=1500

Resin E: Coumarone-indene copolymer resin, "AESCULON G-90" manufactured by Nippon Steel Chemical Co., Ltd., Mn=600, Mw=700

Resin F: Aliphatic petroleum resin, "QUINTONE M100" manufactured by Zeon Corporation, Mn=600, Mw=1200

Resin G: Oil-modified phenol-formaldehyde resin, "SUMILITE RESIN PR-TY-24" manufactured by Sumitomo Bakelite Co., Ltd., Mn=1200, Mw=7500

Wax A: Paraffin wax adjusted to X=35.0 mass %, Y=9.8 mass % and Z=2.6 mass %. Content of linear saturated hydrocarbon=73 mass %, Iso component content=27 mass %

Wax B: Paraffin wax adjusted to X=32.6 mass %, Y=14.3 mass % and Z=2.6 mass %. Content of linear saturated hydrocarbon=80 mass %, Iso component content=20 mass %

Wax C: Paraffin wax adjusted to X=24.6 mass %, Y=16.2 mass % and Z=5.1 mass %. Content of linear saturated hydrocarbon=71 mass %, Iso component content=29 mass %

Wax D: Paraffin wax adjusted to X=41.4 mass %, Y=0.9 mass % and Z=3.2 mass %. Content of linear saturated hydrocarbon=62 mass %, Iso component content=38 mass %

Wax E: Paraffin wax adjusted to X=11.8 mass %, Y=16.1 mass % and Z=7.3 mass %. Content of linear saturated hydrocarbon=61 mass %, Iso component content=39 mass %

Wax F: Paraffin wax adjusted to X=26.9 mass %, Y=20.2 mass % and Z=2.1 mass %. Content of linear saturated hydrocarbon=80 mass %, Iso component content=20 mass %

Wax G: Paraffin wax adjusted to X=29.1 mass %, Y=18.9 mass % and Z=0.9 mass %. Content of linear saturated hydrocarbon=71 mass %, Iso component content=29 mass %

The number average molecular weight (Mn) and weight average molecular weight (Mw) of Resins A to G used as a tackifier are values in terms of polystyrene obtained by the measurement with gel permeation chromatography (GPC). In detail, 0.2 mg of a sample dissolved in 1 mL of THF was used as a measurement sample. Using "LC-20DA" manufactured by Shimadzu Corporation, the sample was passed through a filter, and then passed through a column ("PL Gel 3 µm Guard×2" manufactured by Polymer Laboratories) at a temperature of 40° C. in a flow rate of 0.7 mL/min, and detected with "RI Detector" manufactured by Spectra System.

Adhesion to rolls of each rubber composition in an unvulcanized state was evaluated. Additionally, a test piece was prepared by vulcanizing each rubber composition at 150° C. for 30 minutes, and crack resistance in curing resin, appearance (low temperature, ordinary temperature and high temperature), hardness and ozone resistance of each test piece were evaluated. Each evaluation method is as follows.

Adhesion to rolls: After mixing a rubber composition, a rubber sheet was kneaded with rolls, and adhesion to rolls during kneading was functionally evaluated. The evaluation was performed in 5 grades of score 1 to 5. Evaluation score 3 is standard, evaluation score 1 or 2 means poor adhesion, and evaluation score 4 or 5 means excessive adhesion.

Crack resistance in curing resin (outdoor exposure test): A vulcanized rubber piece was subjected to outdoor exposure for 2 months according to JIS K6266:2007, and the surface thereof was visually observed. A vulcanized rubber piece free of cracks on the surface was indicated by "A", and a vulcanized rubber piece having cracks on the surface was indicated by "B".

Appearance (low temperature, ordinary temperature and high temperature): Vulcanized rubber pieces were placed in ovens adjusted to temperatures of 10° C., 25° C. and 50° C., respectively, and allowed to stand for 3 weeks. Thereafter, the surface of each vulcanized rubber piece was visually observed, and the appearance was evaluated by the following criteria.

A: Surface is black. Alternatively, discoloration is very slight enough to be ignored.

B: The surface is slightly discolored into white or brown.

C: The surface is discolored into white or dark brown.

Hardness: Hardness was measured at 23° C. using Type A durometer according to JIS K6253-3.

Ozone resistance: A test piece was allowed to stand in an atmosphere of 25% elongation and ozone concentration 50 pphm for 24 hours under each condition of a temperature of 10° C., 25° C. and 50° C. according to JIS K6259. The occurrence state of cracks was visually observed. A test piece free of cracks was indicated by "A", and a test piece having cracks was indicated by "B".

The results obtained are shown in Table 2 below. In Comparative Example 1, appearance and ozone resistance are excellent, but adhesion to rolls was poor because of no addition of a resin. In Comparative Example 2, a resin was added, but because the addition amount was small, adhesion to rolls was poor. In Comparative Examples 3 and 4, adhesion to rolls could be enhanced by adding a large amount of a resin. However, because a molecular weight of the resin added was small, cracks by the resin that moved to a rubber surface prior to a wax and cured were observed. In Comparative Example 5, a molecular weight of the resin is too large, and hardness of a vulcanized rubber was excessive. In Comparative Examples 6 to 9, because the carbon number distribution of the wax added was outside the given range, a resin precipitated in first, and thereby cracks occurred in some test pieces. Furthermore, depending on temperature conditions, deterioration of appearance due to excessive blooming of a wax, and decrease of ozone resistance by insufficient blooming were observed. In Comparative Example 10, a wax was not added. Therefore, cracks occurred (not cracks by resin curing), and additionally, ozone resistance was poor. On the other hand, in Examples 1 to 6 in which while adding a large amount of a resin, a resin having a specific molecular weight and a wax having a specific carbon number distribution were concurrently used, a wax could be bloomed before the resin moved to the rubber surface. As a result, the occurrence of cracks due to ultraviolet rays could be suppressed while improving adhesion to rolls, and appearance and ozone resistance were excellent.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

TABLE 1

| Formulation (parts by mass) | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| SBR 1 | 60 | 60 | 60 | 60 | 60 | 60 | 60 | 60 |
| SBR 2 | 40 | 40 | 40 | 40 | 40 | 40 | 40 | 40 |
| Carbon black | 20 | 20 | 20 | 20 | 20 | 20 | 20 | 20 |
| Silica | 70 | 70 | 70 | 70 | 70 | 70 | 70 | 70 |
| Silane coupling agent | 7 | 7 | 7 | 7 | 7 | 7 | 7 | 7 |
| Paraffin oil | 40 | 40 | 40 | 40 | 40 | 40 | 40 | 40 |
| Resin A | | 2 | | | | 10 | 10 | 10 |
| Resin B | | | | | | | | |
| Resin C | | | | | | | | |
| Resin D | | | | | | | | |
| Resin E | | | | 10 | | | | |
| Resin F | | | 10 | | | | | |
| Resin G | | | | | 10 | | | |
| Wax A | | | | | | | | |
| Wax B | 2 | 2 | 2 | 2 | 2 | | | |
| Wax C | | | | | | | | |
| Wax D | | | | | | 2 | | |
| Wax E | | | | | | | 2 | |
| Wax F | | | | | | | | 2 |
| Wax G | | | | | | | | |
| Stearic acid | 2 | 2 | 2 | 2 | 2 | 2 | 2 | 2 |
| Zinc flower | 3 | 3 | 3 | 3 | 3 | 3 | 3 | 3 |
| Age resister | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 |
| Sulfur | 2.1 | 2.1 | 2.1 | 2.1 | 2.1 | 2.1 | 2.1 | 2.1 |

| Formulation (parts by mass) | Comparative Example 9 | Comparative Example 10 | Example 1 | Example 2 | Example 3 | Example 4 | Example 5 | Example 6 |
|---|---|---|---|---|---|---|---|---|
| SBR 1 | 60 | 60 | 60 | 60 | 60 | 60 | 60 | 60 |
| SBR 2 | 40 | 40 | 40 | 40 | 40 | 40 | 40 | 40 |
| Carbon black | 20 | 20 | 20 | 20 | 20 | 20 | 20 | 20 |
| Silica | 70 | 70 | 70 | 70 | 70 | 70 | 70 | 70 |
| Silane coupling agent | 7 | 7 | 7 | 7 | 7 | 7 | 7 | 7 |
| Paraffin oil | 40 | 40 | 40 | 40 | 40 | 40 | 40 | 40 |
| Resin A | 10 | 10 | 10 | 10 | 10 | | | |
| Resin B | | | | | | 10 | | |
| Resin C | | | | | | | 10 | |
| Resin D | | | | | | | | 10 |
| Resin E | | | | | | | | |
| Resin F | | | | | | | | |
| Resin G | | | | | | | | |
| Wax A | | | 2 | | | 2 | 2 | 2 |
| Wax B | | | | 2 | | | | |

TABLE 1-continued

| | | | | | | | | |
|---|---|---|---|---|---|---|---|---|
| Wax C | | | | | | 2 | | |
| Wax D | | | | | | | | |
| Wax E | | | | | | | | |
| Wax F | | | | | | | | |
| Wax G | 2 | | | | | | | |
| Stearic acid | 2 | 2 | 2 | 2 | 2 | 2 | 2 | 2 |
| Zinc flower | 3 | 3 | 3 | 3 | 3 | 3 | 3 | 3 |
| Age resister | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 |
| Sulfur | 2.1 | 2.1 | 2.1 | 2.1 | 2.1 | 2.1 | 2.1 | 2.1 |

TABLE 2

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Resin molecular weight Mw | | — | 2000 | 1200 | 700 | 7500 | 2000 | 2000 | 2000 |
| Wax carbon number distribution (mass %) | X | 32.6 | 32.6 | 32.6 | 32.6 | 32.6 | 41.4 | 11.8 | 26.9 |
| | Y | 14.3 | 14.3 | 14.3 | 14.3 | 14.3 | 0.9 | 16.1 | 20.2 |
| | Z | 2.6 | 2.6 | 2.6 | 2.6 | 2.6 | 3.2 | 7.3 | 2.1 |
| Evaluation | | | | | | | | | |
| Adhesion to rolls | | 1 | 2 | 4 | 4 | 3 | 3 | 3 | 3 |
| Crack resistance in curing resin | | A | A | B | B | A | B | B | A |
| Appearance | 10° C. | A | A | A | A | A | C | A | A |
| | 25° C. | A | A | A | A | A | A | A | C |
| | 50° C. | A | A | A | A | A | A | C | A |
| Hardness | | 75 | 73 | 65 | 64 | 81 | 65 | 65 | 65 |
| Ozone resistance | 10° C. | A | A | A | A | A | A | B | A |
| | 25° C. | A | A | A | A | A | B | A | A |
| | 50° C. | A | A | A | A | A | A | A | A |

| Formulation (parts by mass) | | Comparative Example 9 | Comparative Example 10 | Example 1 | Example 2 | Example 3 | Example 4 | Example 5 | Example 6 |
|---|---|---|---|---|---|---|---|---|---|
| Resin molecular weight Mw | | 2000 | 2000 | 2000 | 2000 | 2000 | 1500 | 2200 | 1500 |
| Wax carbon number distribution (mass %) | X | 29.1 | — | 35.0 | 32.6 | 24.6 | 35.0 | 35.0 | 35.0 |
| | Y | 18.9 | — | 9.8 | 14.3 | 16.2 | 9.8 | 9.8 | 9.8 |
| | Z | 0.9 | — | 2.6 | 2.6 | 5.1 | 2.6 | 2.6 | 2.6 |
| Evaluation | | | | | | | | | |
| Adhesion to rolls | | 3 | 3 | 3 | 3 | 3 | 3 | 3 | 4 |
| Crack resistance in curing resin | | B | B | A | A | A | A | A | A |
| Appearance | 10° C. | A | A | A | A | A | A | A | A |
| | 25° C. | C | A | A | A | A | A | A | A |
| | 50° C. | A | A | A | A | A | A | A | A |
| Hardness | | 65 | 65 | 65 | 65 | 65 | 65 | 65 | 65 |
| Ozone resistance | 10° C. | A | B | A | A | A | A | A | A |
| | 25° C. | A | B | A | A | A | A | A | A |
| | 50° C. | B | B | A | A | A | A | A | A |

What is claimed is:

1. A rubber composition comprising a diene rubber, a tackifier comprising a resin having a weight average molecular weight of from 1,500 to 2,500, and a wax,
    wherein the wax comprises from 24.0 to 35.0 mass % of a linear saturated hydrocarbon having from 25 to 30 carbon atoms, from 9.0 to 17.0 mass % of a linear saturated hydrocarbon having from 35 to 40 carbon atoms, and from 2.0 to 6.0 mass % of a linear saturated hydrocarbon having 45 or more carbon atoms, in 100 mass % of the wax,
    the content of the linear saturated hydrocarbons in 100 mass % of the wax is from 70 to 100 mass %, and
    the amount of the tackifier added is larger than the amount of the wax added.

2. The rubber composition according to claim 1, wherein the amount of the tackifier added is from more than 5 to 20 parts by mass per 100 parts by mass of the diene rubber, and the amount of the wax added is from 1.5 to 5 parts by mass per 100 parts by mass of the diene rubber.

3. The rubber composition according to claim 1, wherein the tackifier comprises at least one resin selected from the group consisting of a petroleum resin, a phenol resin, a coumarone-based resin, a terpene-based resin and an aromatic vinyl polymer.

4. The rubber composition according to claim 1, wherein the tackifier comprises at least one resin selected from the group consisting of an aliphatic petroleum resin, an aromatic petroleum resin, an aliphatic/aromatic copolymerized petroleum resin, a phenol-formaldehyde resin, an alkylphenol-formaldehyde resin, alkylphenol-acetylene resin, an oil-modified phenol-formaldehyde resin, a coumarone resin, a coumarone-indene resin, a polyterpene, a terpene-phenol resin, poly(α-methylstyrene), a polystyrene and a styrene-α-methylstyrene copolymer.

5. The rubber composition according to claim 1, wherein the amount of the tackifier added is from 7 to 15 parts by mass per 100 parts by mass of the diene rubber, and the amount of the wax added is from 1.5 to 4.0 parts by mass per 100 parts by mass of the diene rubber.

6. A pneumatic tire comprising the rubber composition according to claim 1.

7. The rubber composition according to claim 1, wherein the tackifier comprises at least one resin selected from the group consisting of a phenol resin, a coumarone-based resin, a terpene-based resin and an aromatic vinyl polymer.

* * * * *